United States Patent [19]

Milke

[11] 3,722,261
[45] Mar. 27, 1973

[54] METHOD OF AND APPARATUS FOR LOCATING LEAK AREAS OF PIPE LINES, ESPECIALLY UNDERGROUND PIPE LINES

[75] Inventor: George Milke, Munster, Germany

[73] Assignee: Hoesch Aktiengesellschaft, Dortmund, Germany

[22] Filed: Dec. 10, 1970

[21] Appl. No.: 97,456

[52] U.S. Cl. .................................................73/40.5 R
[51] Int. Cl. ..........................G01m 3/02, G01m 3/26
[58] Field of Search ..................73/40.5 R, 40.5 A, 40

[56] References Cited

UNITED STATES PATENTS

| | | | |
|---|---|---|---|
| 2,731,826 | 1/1956 | Wiley | 73/40.5 R |
| 3,561,490 | 2/1971 | Little | 73/49.1 X |
| 2,601,248 | 6/1952 | Brenholdt | 73/40.5 R |
| 3,132,506 | 5/1964 | Pritchett | 73/40.5 R |

Primary Examiner—Louis R. Prince
Assistant Examiner—Denis E. Corr
Attorney—Walter Becker

[57] ABSTRACT

A method and apparatus for locating leaks in conduits, such as pipes, particularly underground pipes. The apparatus comprises a member to be placed in the pipe and is free therein and can be moved from position to position along the pipe by a supply of fluid to the pipe on one side or the other of the member. The member is adapted to be sealed to the pipe and has a flow passage therethrough having flow sensitive measuring instrumentalities therein. The member also, preferably, includes a broadcasting device which broadcasts signals received from the instrumentalities to a remote station wherein the signals can be read.

19 Claims, 9 Drawing Figures

INVENTOR
Georg Milke
By
Walter Becker

INVENTOR
Georg Wilke
By

INVENTOR
Georg Milke

METHOD OF AND APPARATUS FOR LOCATING LEAK AREAS OF PIPE LINES, ESPECIALLY UNDERGROUND PIPE LINES

The present invention relates to a method of and apparatus for locating leak areas of pipe lines, especially underground pipe lines, and, more specifically concerns a method and apparatus of the above mentioned general type according to which by means of a pressure medium a measuring instrument equipped with registering devices is introduced into a passage whereupon at various areas along the length of the pipe line the flow values are measured and are conveyed to an evaluating device above ground to thereby aid in finding the location of the leak.

In view of the relatively high costs involved in such a procedure and in particular in view of the danger of polluting the ground water when oil conducting pipe lines are involved, it is of particular importance to develop a safe and economic system for testing pipe lines as to leaks and for ascertaining the location of such leaks and possibly also the magnitude of such leaks.

In conformity with existing regulations, it is necessary prior to putting into operation a pipe line for the transport of liquid or gaseous substances, to carry out tests to find out that the pipe line is leakproof, and further such tests are mandatory from time to time when servicing installed pipe lines.

In order to carry out such tests, the pipe line is either over its entire length or over sections thereof filled with water which is then subjected to a prescribed testing pressure produced by high pressure pumps. If the pipe line is leakproof, the testing pressure will remain constant over a number of hours taking into consideration the fact that the temperature of the ground and of the pressure medium changes. However, if the pipe line looses water at one of more places, in other words if the pipe line is not leakproof, the testing pressure will drop accordingly. The quantity of water leaking out per time unit furnishes an indication or measurement for the magnitude of the leak area and can be ascertained in conformity with particularly developed formulas.

When by means of such tests water losses are ascertained, the specific leak areas must be located which is rather easy with overground pipe lines or pipe line sections inasmuch as in such instances the discharge of the leaking liquid can be observed. However, when underground pipe lines are involved, the ascertainment of a leak and of the leaking area is very difficult, and the location of such leak areas, especially when smaller and medium leaks are present (leakage losses from about 4 to 50 dcm$^3$/h) is very time consuming and expensive.

In this connection, of the many heretofore known methods and devices, reference may be had, for instance, to the safe but time consuming and expensive "-cutting method" according to which the pipe line is cut up into sections and the sections are tested individually. Also known is the method of listening to the leaking noises in the pipe line or the method of sniffing nitrous oxide gas or laughing gas over the pipe line after the latter has been filled with water under pressure containing $N_2O$. With these last mentioned methods, the desired success frequently did not occur at all because the result depends to a great extent on the position of the leak and the respective ground conditions.

U.S. Pat. Nos. 2,951,362 En Dean et al. issued Sept. 6, 1960 and 3,132,506 Pritchett issued May 12, 1964 disclose a testing method according to which by means of the fluid passing through the pipe line a so-called mole is conveyed through the pipe line which carries measuring and registering devices. Such mole is provided with at least two sealing rings which sectionwise together with the inner wall of the pipe form chambers sealed relative to the remaining part of the pipe line. The mole is moved through the entire length of the pipe line to be tested. If leaking areas are present between the sealing rings, the pressure drop brought about by the leakage is measured in various ways and is registered on a tape which gives an indication as to the location of the leaking area in the pipe line so that after the removal of the mole from the pipe line the location and possibly also the magnitude of the leaking area can be determined.

Arrangements of this type have the great disadvantage that the sealing sleeves must slide on the inner surface of the pipe along the entire length of the section to be tested so that they are subjected to considerable wear. Only a slight wear of one of the two sealing rings will already suffice to impair the functioning of the device if such slight wear is great enough to permit a pressure equalization as a result of which the measuring instruments do not respond at all or give an incorrect reading.

According to another embodiment illustrated in U.S. Pat. No. 2,940,302 Scherbatskoy issued June 14, 1960, a measuring device is likewise carefully and in a registering manner moved during the operation of the pipe line along the entire length of the pipe line to be tested while measuring possible radial components of the fluid flow which radial components will occur when the radial mouths of an axial inlet opening enter the region of a leak. This device is not suitable for the precise detection of leaking areas because it responds only to larger leaks. Moreover, with this device similar to the previously described device, a precise locating of the leaking area is not possible inasmuch as merely the existence of a possible axial flow can be ascertained but not the pertaining axial starting direction thereof.

U.S. Pat. No. 3,196,686 Cole issued July 27, 1965 discloses a measuring mole which for purposes of detecting leaking areas measures the throughflow direction or throughflow quantity in a pipe line and furnishes these data to an evaluating device located outside the pipe line so that it will be possible to draw conclusions concerning the location of a leak.

This measuring mole is at its circumference provided with two sealing rings the outer diameter of which corresponds to the inner diameter of the pipe line to be tested and on which the measuring mole is moved during the measuring operations in the pipe line. The presence of a leak and the location thereof can assumed when during the movement of the mole along the length of the pipe line irregularities are encountered in the oppositely located diaphragms continuously subjected to pressure or when irregularities occur in the measuring results obtained by the employment of rotatable permanent magnets, resistive wire strains or throughflow gauges.

In addition to the many necessary measuring instruments, all above referred to types of leak detecting devices require that the seal between the inner wall of the pipe line and the sealing rings subjected to considerable wear is of maximum efficiency which, however, cannot be assured by the above mentioned designs inasmuch as the sealing rings, also while proceeding to the respective measuring sections, will rub against the frequently rough inner wall of the pipe, and because they cannot adapt themselves, at least not for a longer period of time, to any deformation of the pipe which may occur as a result of the testing pressure.

Minor leaks, as for instance hairline tears, in the pipe line cannot be ascertained by the above mentioned type of measuring the quantity of the throughflow because of the lack of precision of the throughflow measuring instruments in the lower area of the measuring region which is the very region which is of decisive importance in the just mentioned instance. Inasmuch as the pipe will under the necessary testing pressure widen to up to 90 percent of the elastic limit of the material of which the pipe is made, a small quantity of the measuring medium passes by the measuring instrument so that the volume of the measuring medium passing through the measuring instrument is correspondingly decreased. This means that small leaks cannot be detected by the above mentioned known type of leak detector.

Furthermore, East German Pat. No. 22,079 discloses the method of continuously checking one or more intercommunicating pipe lines with respect to the throughflow thereof. When a leak occurs, resistance thermometers are in conformity with the thus changing quantity of the throughflow subjected to different pressures at the respective measuring areas, as a result of which the resistance of a resistance thermometer passed through by a constant flow is changed.

This embodiment thus discloses a device with two measuring instruments for measuring the flow quantity which measuring instruments are fixedly installed in the pipe line in spaced relationship to each other for ascertaining whether any leaking areas are present and does not permit a conclusion concerning the definite location of any possible leaks.

U.S. Pat. No. 2,975,637 Burdick issued Mar. 21, 1961 discloses a method according to which in empty pipe lines certain sections are sealed off by balloons which are supplied from the outside with compressed air in order to be able in the respective sealed off pipe section to measure the water level of water entering into the pipe through leaks.

It is an object of the present invention to provide a leak detecting device which will permit an economic, safe and also precise determination of leaking areas in pipe lines and which will also assure the locating of small leaking areas in pipe lines which are under a testing pressure, which testing pressure is in the vicinity of the elastic limit of the material from which the pipe is made and at which testing pressure an elastic increase in the volume of the pipe and thereby of the pipe diameter occurs.

These and other objects and advantages of the invention will appear more clearly from the following specification in connection with the accompanying drawings, in which.

Figure 1:
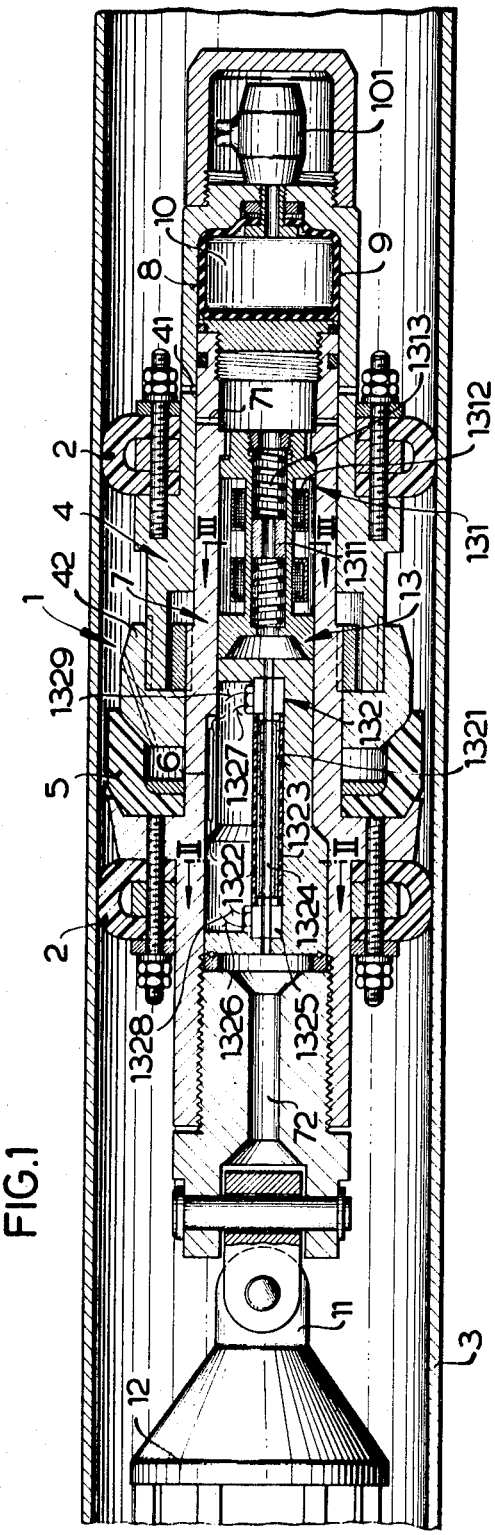
FIG. 1 illustrates a longitudinal section through a measuring mole according to the present invention.
Figure 3:
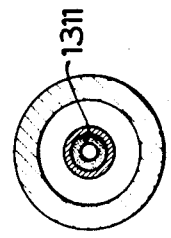
FIG. 3 represents a section taken along the line III—III OF FIG. 1.
Figure 2:
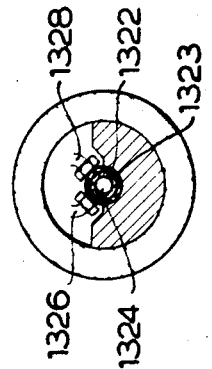
FIG. 2 represents a section taken along the line II—II of FIG. 1.

The method according to the present invention provides that for locating leaking areas, especially in underground pipe lines, a measuring mole equipped with recording instruments is with the aid of a pressure medium introduced into the pipe line to be checked while at a plurality of sections of the pipe line the respective throughflow values are measured and the measuring result is conveyed to an evaluating device above the ground. The invention is characterized primarily in that at the respective measuring section the measuring mole is by increasing the pressure of the pressure medium pressed in a sealing manner against the interior wall of the pipe line while simultaneously the passage through the measuring mole is opened. After an effected measuring step, the measuring mole is by a reduction in the pressure freed and is subsequently by the supply of pressure or by the release of pressure moved to the next measuring section.

The method according to the present invention makes it possible, as will be explained in detail further below, to realize a safer, simpler and more precise ascertainment of leaking areas in pipe lines. It is merely necessary over the entire length of the pipe line at a few sections evenly spaced from each other to measure the respective quantity of the throughflow and the direction of the throughflow. In conformity with the measured values, graphs are automatically plotted which enable the determination of the number and location of the leaking areas. If the location of a leak was not sufficiently precisely ascertained with the first measurements, the mole is deliberately aimed at the assumed location of the leak until a change in the direction of the flow and/or a stepwise reduction or increase in the quantity of the throughflow is ascertained.

Advantageously, with the method according to the invention only one sealing sleeve is brought into connection with the interior wall of the pipe, namely during the actual measuring step, in other words, while the mole is in its rest position, so that no material wear will occur and a relatively high degree of safety and a long life of the device will be assured also when trying to detect minute leaking areas.

The automatic bracing of the mole and the control of the throughflow by the mole in conformity with the direction and thus the actuation of the measuring devices and the automatic release of the mole after the completion of the measuring operation are to be mentioned as outstanding features of the present invention.

The device according to the invention, in which the measuring mole in a passage comprises the throughflow measuring devices while each end of the measuring mole is equipped with a transporting sleeve, is characterized primarily in that an outer sleeve is displaceably arranged on an inner sleeve and cooperates with a sealing sleeve connected to the inner sleeve. The device is furthermore characterized in that the actuation of the throughflow openings at that end of the inner sleeve which faces away from the sealing sleeve is adapted to be controlled by an outer sleeve.

In view of the fact that the sealing sleeve increases its diameter in response to pressure exerted by the outer sleeve, and in view of the fact that the sealing sleeve reduces its diameter when said pressure is relieved, a high degree of safety in operation and precision in the measuring process is assured.

According to a further feature of the invention, a pressure container is provided which is preferably equipped with a fill-up valve and is designed as a rubber balloon, the pressure container being arranged in a cylindrical chamber defined by the inner sleeve and the outer sleeve. As a result thereof, the increase in pressure in the pressure container due to the fact that the outer and inner sleeves move into each other may be employed for moving the outer and inner sleeve away from each other after the pressure of the pressure medium has again been reduced. The purpose of the fill-up valve consists in establishing such a pressure in the pressure container that it will be safely above that highest hydrostatic pressure in the pipe line to be checked which will prevail in view of different altitudes, since otherwise an undesirable jamming of the mole may occur.

According to a further feature of the invention, the throughflow measuring device comprises a coarse and a fine measuring device for ascertaining the quantity and the direction of the throughflow so that in view of this combination a specific measuring system for larger as well as for smaller leaking areas is obtained.

The coarse measuring device comprises primarily a soft iron core with a bore therethrough which core is displaceably held between two induction coils and equalizing springs.

The fine measuring device comprises primarily a heating wire the ends of which have connected thereto hot conductor resistors in the manner of a Wheatstone bridge.

The turning-on and the turning-off of the throughflow measuring device is effected through the intervention of a magnetic switch which is operable by a spacer ring designed as a permanent magnet.

Referring now to the drawings in detail, each end of the measuring mole 1 is provided with a transporting sleeve 2 which rests on the inner wall of pipe 3. One of the two sleeves 2 is connected to an outer sleeve 4 whereas the other sleeve 2 is together wit a sleeve 5 connected to an inner sleeve 7 equipped with a magnetic sleeve 6.

The outer sleeve 4 is displaceably mounted on the inner sleeve 7. Outer sleeve 4 and inner sleeve 7 are provided with throughflow openings 41 and 71 uniformly distributed over the circumference. Inner sleeve 7 and outer sleeve 4 together define a cylindrical chamber 8 having arranged therein a rubber balloon 9 which acts as pressure container 10 and is equipped with a fill-up valve 101. A housing 12 with an emitter and a battery (not illustrated in detail) is connected through a coupling 11 to the measuring mole 1.

Arranged in the inner sleeve 7 is a measuring device 13 for measuring the throughflow. The supply of current to the device 13 is controlled by actuation of the magnetic switch 6 by means of the spacer ring 42.

The coarse measuring device 131 primarily comprises a soft iron core 1311 which is movably held between two induction coils 1312 and two adjusted equalizing springs 1313.

The fine measuring device 1321 has a heating wire 1321 so arranged in a cast body 1322 and a pipe 1323 of synthetic material that a throughflow opening 1324 remains. The ends of the heating wire 1321 have soldered thereto copper pieces 1325 in which temperature resistant resistors, preferably hot conductor resistors 1326–1329 are provided which are arranged in the manner of a measuring bridge (see FIGS. 5 and 6).

Figure 7:
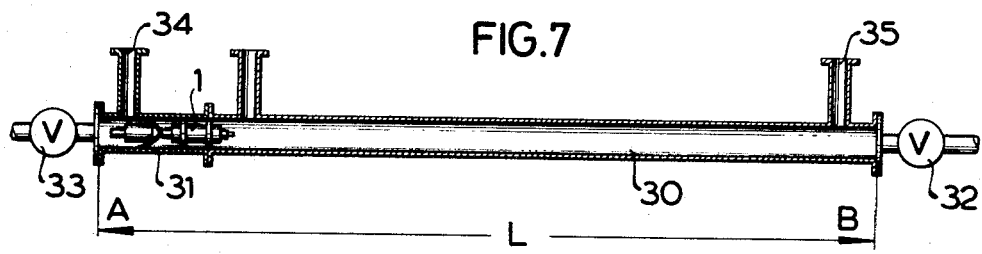
FIG. 7 shows on a smaller scale than that of FIG. 1 a section of a pipe line to be checked.

The operation of the device is as follows: Prior to the start of the actuation of the leak detecting device, the pipe line 30 (FIG. 7) is provided with sluice 31 while the two ends of the pipe line are equipped with valves 32 and 33 respectively. Advantageously, one end of the sluice 31 has connected thereto a fill-up pump 34 while the other end has connected thereto a high pressure pump 35. After opening and subsequently closing sluice 31, it is possible by having a pump 34 deliver water under pressure and by simultaneously opening the valve 32 to move the measuring mole 1 to any desired section of the previously preferably ventilated and cleaned pipe line 30. The quantity of the pumped-in water is an approximate indication for the length of the transporting stroke or path of the mole. After the measuring mole 1 has reached its desired position, the pipe line is brought up to testing pressure by means of the high pressure pump 35. Now the measuring mole becomes effective. After its location has been determined and the measured data have been received, the pipe line is again made pressure-less and the measuring mole is as described above moved to the next measuring position. If this last mentioned position is located in a section which was already passed through by the measuring mole, the transport of the mole is effected by pumped-in water from the other end of the pipe line while the valve 33 is open.

The measuring mole (see FIG. 1) operates in such a manner that in view of the testing pressure the outer sleeve 4 and the inner sleeve 7 move relative to each other and toward each other. This brings about the following operations: The shut-off sleeve 5 is by means of the spreader ring 42 of the outer sleeve 4 pressed in a sealing manner against the inner wall of the pipe 3. The throughflow openings 71 are freed, and thereby a throughflow through the throughflow measuring device 13 and the throughflow bore 72 is made possible. By actuation of the magnetic switch 6 by means of the expanding or spreader ring 42 forming a permanent magnet, the connection to the battery is established whereby the emitter and the throughflow measuring device are put into operation. Finally an increase in pressure in the pressure container 10 is effected through the decreasing cylinder chamber 8.

After the measuring mole has been placed at its desired location and in a manner described further below the respective quantity and direction of the throughflow have been measured and the result of these measurements have been conveyed to an evaluating device above ground, the pipe line is made pressureless. As a result thereof, the air previously compressed in the pressure container 10 returns the outer sleeve 4 and the inner sleeve 7 to their respective starting positions whereby the sealing sleeve 5 is freed, the battery current is disengaged and the throughflow openings 71 are closed. Subsequently the measuring mole is moved to its next measuring position.

The measuring of the throughflow quantity and of the throughflow direction is with larger leaking areas, in other words greater movement of the fluid, effected by the coarse measuring device 131 in such a way that in view of the flow the soft iron core 1311 will more or less deeply immerse into one of the two induction coils 1312. The thus produced change in the induction represents a measurement for the direction and quantity of the throughflow and is in a wireless manner conveyed to an evaluating device above the ground (see also FIG. 4).

Figure 5:
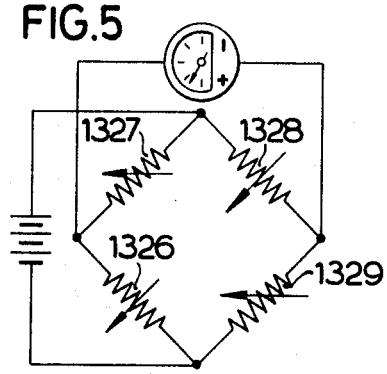
FIG. 5 is a fine measuring circuit applying to one direction of throughflow.
Figure 6:
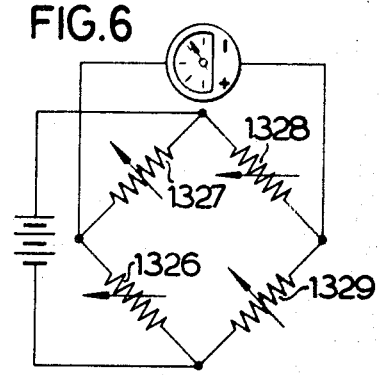
FIG. 6 is a fine measuring circuit applying to the other direction of throughflow.

The operation of the fine measuring device 132 for minor leaking areas is as follows: The liquid passes through the throughflow opening 1324 and is heated up by the heating wire 1321. Depending on the direction of flow, the hot conductor resistors 1326 and 1328 (FIG. 6) or 1327 and 1329 are heated up (FIG. 5).

Figure 4:
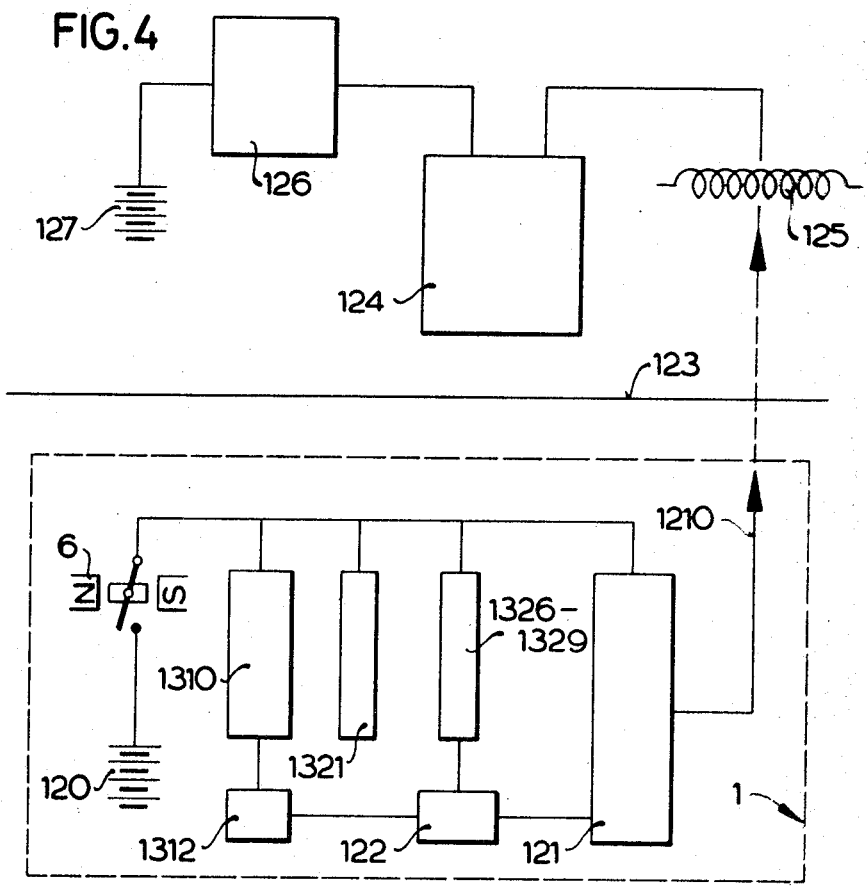
FIG. 4 shows the circuit for the device of FIG. 1.

Inasmuch as the heat conductor resistors are arranged in the manner of a measuring bridge, it will be appreciated that a corresponding measuring current will flow as a result of the changes in the resistances. The direction of this measuring current depends on the direction of the flow of the fluid, and the magnitude of the measuring current is proportional to the intensity of the fluid flow, in other words of the throughflow quantity. The measuring current is conveyed to the outside in a wireless manner through a modulator 122 (FIG. 4). The function of the measuring value receiver, measuring value transmitter and measuring value indicator is illustrated in principle in FIG. 4.

The magnetic switch 6 turns on the current of the battery 120 for receiving and transmitting the measured value when the pressure of the testing fluid is increased whereas when the pressure of the testing fluid is decreased, the magnetic switch turns off the current of the battery 120. The alternating current generator 1310, the induction coils 1312, the heating wire 1321, the heat conductor resistors 1326 – 1329 and the emitter 121 are arranged in parallel with regard to the battery current. In conformity with the direction and the intensity of the throughflow, the modulator 122 receives its induction current from the induction coils 1312, the coarse measuring device 131 or receives current from the hot conductor resistors 1326 – 1329 of the fine measuring device 132. The modulator 122 varies the emitter frequency, conveys the measured value in conformity with the carrier frequency method or another method to the emitter 121 through the antenna 1210 to above ground 123. The receiver part comprises primarily a receiver 124 with aerial and detector coil 125 as well as a measuring indicator 126 and a battery 127.

The measured values ascertained and conveyed by the measuring mole with regard to direction and quantity of the throughflow as well as the location of the measuring mole are compiled by means of corresponding devices or manually and expressed in graphs while the individual values permit a conclusion as to the location and number of the leaking areas.

In connection with the evaluation of the measured values, the following considerations are to be made.

In a pipe line under pressure, the pipe cross-section will at each area increase in view of the elastic deformation of the pipe wall. The increase in volume thus created over the entire length of the pipe line corresponds to the quantity of water which is necessary to bring the already filled pipe line to a certain pressure. If this pipe line under pressure has a leaking area, the pressure will everywhere in the pipe line practically simultaneously drop which means that everywhere in the pipe line the cross-section of the pipe decreases and furnishes water for the leakage loss. Thus, the water will progressively and to an increasing degree flow from the ends of the pipe line to the leaking area which means the throughflow quantity increases with increasing distance from the ends of the pipe line in conformity with the equation:

$$V_x = \Delta V \times X/L.$$

If only one leaking area is present in the pipe line (see FIG. 8), the leakage water will flow to the leaking area from both sides. On the right-hand side of the leaking area the water flows toward the left and on the left-hand side of the leaking area the water flows toward the right. The flowing quantity ($V_x$ = through flowing quantity at measuring point $x$, e. g., in FIG. 8 at point 801) of water is dependent on the magnitude of the leak ($\Delta V$ = outflow quantity at the leakage location, e. g., in FIG. 8, leakage location 800) and the ratio of the distance of the leaking area from the respective pipe end ($X$ = distance from pipe end to measuring point, in FIG. 8 the distance from B to 801) to the total length of the pipe ($L$ = total conduit length, in FIG. 8 distance A–B).

Figure 8:
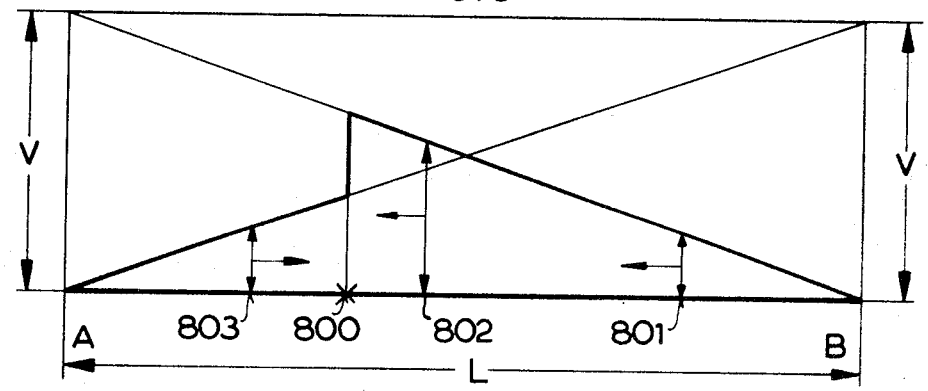
FIG. 8 shows a graph pertaining to a pipe line with one leaking area.

According to FIG. 8, the first measurement at 801 will indicate the distance from B and the quantity of the throughflow and also will in view of the measured direction of the throughflow, indicate that the leaking area 800 is located on the lefthand side of the measuring area. The same result is obtained when measuring at the area 802. The measuring at the area 803 will in view of the change in the throughflow direction and the consequently smaller throughflow quantity indicate that the leaking area 800 is located between the measuring areas 802 and 803.

The precise location of the leaking area is established by an aimed approach up to the ascertainment of the area where the throughflow direction changes or until starting at the measuring area 803 the stepwise increase of the throughflow quantity is established. V represents the leakage losses which are calculated by special equations while taking into consideration changes in temperature and pressure during the checking of a leaking pipe section.

Figure 9:
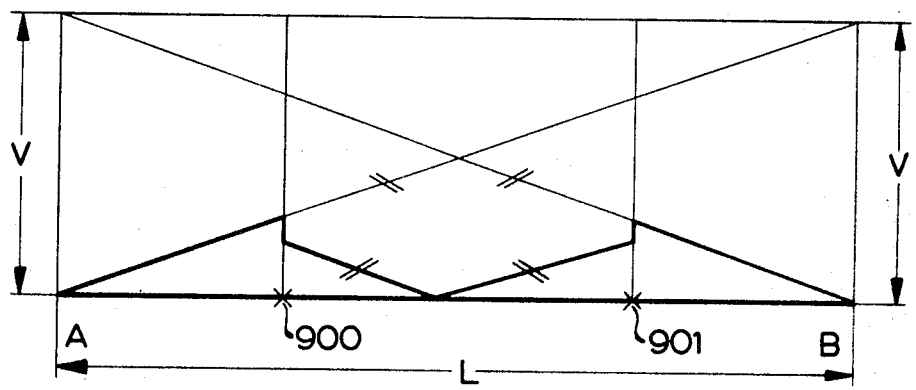
FIG. 9 shows a graph pertaining to a pipe line with two leaking areas.

When two or more leaking areas are present (FIG. 9), The throughflow direction and the throughflow quantity at the leaking areas 900 and 901 depend on the magnitude of the leaks and the respective distance of the leaks from the ends of the pipe line. The medium may flow to the leaking area from both sides or the throughflow direction may be equal at both sides of the leaking area while only the throughflow quantity may be different. In any case it is possible by means of the device according to the present invention to detect the leaking areas in conformity with the measured values ascertained at different places.

It is, of course, to be understood that the present invention is, by no means, limited to the specific showing in the drawings but also comprises any modifications within the scope of the appended claims.

What is claimed is:

1. The method of detecting leaks in a pipe which comprises: introducing a member having flow passage therethrough into said pipe, automatically sealing said member to match changing expansions inside of said pipe, filling the pipe with fluid on both sides of said member, initially developing the same pressure on the fluid on both sides of said member, and subsequently detecting the magnitude and direction of any movement of fluid in said flow passage and thus the size of the leak and position of the leak relative to said member.

2. A method according to claim 1 which further includes transmitting by wireless results of direction of movement of said fluid to determine the side of said member on which the leak is located, and automatically releasing said member.

3. The method of detecting leaks in a pipe which comprises: introducing a member having flow passage therethrough into said pipe, sealing said member to the inside of said pipe, filling the pipe with fluid on both sides of said member and developing pressure on the said fluid, and detecting movement of fluid in said flow passage, the direction of movement of said fluid being detected to determine the side of said member on which the leak is located, the rate of said movement of fluid being detected to determine the size of said leak.

4. The method according to claim 3 in which the location of said member in said pipe is adjusted along the length of said pipe and readings of the rate and direction of the said movement of fluid in said flow passage are taken in each adjusted position of said member to determine the location along said pipe of any leaks therein.

5. The method according to claim 4 in which values conforming to the detected rates and direction of movement of fluid in said flow passage are generated in said member and are transmitted to a remote receiving station to be read therein whereby leaks can be located in a pipe in an inaccessible location, such as in an underground location.

6. A device for use in determining the location of leaks in pipes and comprising: a member including inner and outer sleeves receivable in the pipe and having flow passage therethrough, sealing means operable when actuated for sealing said member to the inside of a pipe, and fluid flow sensitive means in said member operatively associated with said flow passage for measuring fluid flow in said passage.

7. A device for use in determining the location of leaks in pipes and comprising: a member receivable in the pipe and having flow passage therethrough, sealing means operable when actuated for sealing said member to the inside of a pipe, fluid flow sensitive means in said member operatively associated with said flow passage for measuring fluid flow in said passage, said member comprising inner and outer sleeves telescopically arranged, means for moving said sleeves relatively in the axial direction, and means responsive to movement of said sleeves relatively in one direction for actuating said sealing means into sealing engagement with the inside of the pipe while establishing said flow passage, and to movement of said sleeves relatively in the opposite direction for releasing said seal means from actuated position while interrupting said flow passage.

8. A device according to claim 7 which includes axially spaced guide elements carried by said member for slidably supporting said member in the pipe.

9. A device according to claim 7 in which said sealing means is a cup shaped seal mounted on one of said sleeves and having the open side thereof facing the other of said sleeves, and said other sleeve has tapered end portion facing said cup shaped seal adapted to enter the open side of the seal and expand the seal into sealing engagement with the inside of the pipe.

10. A device according to claim 7 which includes a chamber confined by said inner and outer sleeves, and means for developing pressure in said chamber for moving said sleeves relatively in the axial direction.

11. A device according to claim 10 which includes a rubber-like bag in said chamber, and means for supplying pressure to the inside of said bag for moving said sleeves relatively in the axial direction.

12. A device according to claim 7 in which said flow sensitive means includes first means sensitive to larger rates of fluid flow in said passage and second means responsive to smaller rates of fluid flow in said passage.

13. A device for use in determining the location of leaks in pipes and comprising: a member receivable in the pipe and having flow passage therethrough, sealing means operable when actuated for sealing said member to the inside of a pipe, fluid flow sensitive means in said member operatively associated with said flow passage for measuring fluid flow in said passage, said flow sensitive means including first means sensitive to larger rates of fluid flow in said passage and second means responsive to smaller rates of fluid in said passage, said first means comprising a pair of electric coils surrounding said passage in axial relation, a soft iron core member in said passage having an axial bore, and centering spring means normally holding said core in a predetermined axial position relative to said coils and yieldable upon fluid flow in said passage to permit movement of said core relative to said coils.

14. A device according to claim 13 in which said second means comprises a heating element to heat fluid flowing in said passage, and temperature sensitive resistor means at opposite axial ends of said heating means engaged by fluid flowing in said passage.

15. A device according to claim 14 in which said resistor means are connected in a bridge circuit.

16. A device according to claim 13 in which said flow sensitive means is electrically operable and develops electrical signals in conformity with the rate and direction of fluid flow in said passage, and transmitting means in said member operable to receive said signals and to transmit the signals to a location outside said pipe and remote from said member.

17. A device for use in determining the location of leaks in pipes and comprising: a member including inner and outer sleeves receivable in the pipe and having flow passage therethrough, sealing means operable when actuated for sealing said member to the inside of a pipe, fluid flow sensitive means in said member operatively associated with said flow passage for measuring fluid flow in said passage, said flow sensitive means including first means sensitive to larger rates of fluid flow in said passage and second means responsive to smaller rates of fluid flow in said passage, said flow sensitive means being electrically operable, a switch in said member controlling said flow sensitive means, and means operated by relative movement of said sleeves in sealing direction to actuate said switch.

18. A device according to claim 17 in which said switch is a magnetically operable reed switch mounted on one of said sleeves and the other of said sleeves comprises a permanent magnet for actuating said switch when said sleeves move relatively into sealing position.

19. A device for use in determining the location of leaks in pipes and comprising: a member receivable in the pipe and having flow passage therethrough, sealing means operable when actuated for sealing said member to the inside of a pipe, fluid flow sensitive means in said member operatively associated with said flow passage for measuring fluid flow in said passage, said member comprising inner and outer sleeves telescopically arranged, means for moving said sleeves relatively in the axial direction, and means responsive to movement of said sleeves relatively in one direction for actuating said sealing means into sealing engagement with the inside of the pipe while establishing said flow passage, and to movement of said sleeves relatively in the opposite direction for releasing said seal means from actuated position while interrupting said flow passage, said flow sensitive means including first means sensitive to larger rates of fluid flow in said passage and second means responsive to smaller rates of fluid flow in said passage, means adapted for remote operation for actuating the said means for moving said sleeves relatively whereby said member can be free in said pipe and be moved therein by a supply of fluid to the pipe on one side or the other of said member when said sleeves are in sealing means release position.

* * * * *